United States Patent
Xu et al.

(10) Patent No.: US 10,438,753 B2
(45) Date of Patent: Oct. 8, 2019

(54) ELECTROLYTES IN SUPPORT OF 5V LI ION CHEMISTRY

(75) Inventors: Kang Xu, North Potomac, MD (US); Arthur Von Cresce, Rockville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 12/952,354

(22) Filed: Nov. 23, 2010

(65) Prior Publication Data

US 2012/0009485 A1    Jan. 12, 2012

Related U.S. Application Data (60) Provisional application No. 61/361,625, filed on Jul. 6, 2010.

(51) Int. Cl.
*H01G 11/58* (2013.01)
*H01M 2/16* (2006.01)
(Continued)

(52) U.S. Cl.
CPC .......... *H01G 11/58* (2013.01); *H01M 2/1653* (2013.01); *H01M 10/052* (2013.01);
(Continued)

(58) Field of Classification Search
CPC ......... H01M 10/0567; H01M 10/0568; H01M 10/0569; H01M 10/052; H01M 2/1653; H01G 11/58; H01G 11/62
See application file for complete search history.

(56) References Cited

U.S. PATENT DOCUMENTS

| | | |
|---|---|---|
| 4,894,302 A | 1/1990 | Hoffman et al. |
| 5,021,308 A | 6/1991 | Armand et al. |

(Continued)

FOREIGN PATENT DOCUMENTS

| | | | | |
|---|---|---|---|---|
| JP | 62080976 A | * | 4/1987 | ............ H01M 10/05 |
| JP | 2001-256995 A | | 9/2001 | |

(Continued)

OTHER PUBLICATIONS

Machine translation of Japanese Patent Publication No. 2004-259682A, publication date Sep. 16, 2004.*

(Continued)

*Primary Examiner* — Sarah A. Slifka
*Assistant Examiner* — Lilia Nedialkova
(74) *Attorney, Agent, or Firm* — Eric Brett Compton; Robert Thompson (57) ABSTRACT

This invention described the preparation of a series of compounds that can be used as co-solvents, solutes or additives in non-aqueous electrolytes and their test results in various electrochemical devices. The inclusion of these novel compounds in electrolyte systems can enable rechargeable chemistries at high voltages that are otherwise impossible with state-of-the-art electrolyte technologies. These compounds are so chosen because of their beneficial effect on the interphasial chemistries formed at high potentials, such as 5.0 V class cathodes for new Li ion chemistries. The potential application of these compounds goes beyond Li ion battery technology and covers any electrochemical device that employs non-aqueous electrolytes for the benefit of high energy density resultant from high operating voltages.

17 Claims, 2 Drawing Sheets

(51) Int. Cl.
H01M 10/052 (2010.01)
H01M 10/0567 (2010.01)
H01M 10/0568 (2010.01)
H01M 10/0569 (2010.01)

(52) U.S. Cl.
CPC ... H01M 10/0567 (2013.01); H01M 10/0568 (2013.01); H01M 10/0569 (2013.01); *Y02E 60/13* (2013.01)

(56) References Cited

U.S. PATENT DOCUMENTS

| | | | |
|---|---|---|---|
| 5,580,684 A * | 12/1996 | Yokoyama et al. | 429/324 |
| 5,750,284 A | 5/1998 | Pendalwar et al. | |
| 5,753,389 A | 5/1998 | Gan et al. | |
| 5,824,433 A | 10/1998 | Angell et al. | |
| 5,908,717 A | 6/1999 | Pendalwar et al. | |
| 6,010,806 A | 1/2000 | Yokoyama et al. | |
| 6,022,643 A | 2/2000 | Lee et al. | |
| 6,316,141 B1 | 11/2001 | Aurbach et al. | |
| 6,492,064 B1 | 12/2002 | Smart et al. | |
| 6,924,061 B1 | 8/2005 | Jow et al. | |
| 6,939,647 B1 | 9/2005 | Jow et al. | |
| 7,087,349 B2 | 8/2006 | Kim et al. | |
| 7,255,965 B2 | 8/2007 | Xu et al. | |
| 7,311,993 B2 | 12/2007 | Ivanov et al. | |
| 7,348,103 B2 | 3/2008 | Ivanov et al. | |
| 7,582,389 B2 | 9/2009 | Matsui et al. | |
| 7,718,319 B2 | 5/2010 | Manthiram et al. | |
| 7,754,380 B2 | 7/2010 | Abe et al. | |
| 2004/0091772 A1* | 5/2004 | Ravdel | H01M 10/0525 429/188 |
| 2005/0008939 A1* | 1/2005 | Ota | H01M 4/0404 429/324 |
| 2006/0172201 A1 | 8/2006 | Yasukawa | |
| 2006/0210883 A1 | 9/2006 | Chen | |
| 2007/0042271 A1 | 2/2007 | Nishida et al. | |
| 2007/0072084 A1* | 3/2007 | Nishie | 429/324 |
| 2007/0092803 A1* | 4/2007 | Nakanishi et al. | 429/326 |
| 2007/0207389 A1 | 9/2007 | Hamamota et al. | |
| 2007/0218364 A1 | 9/2007 | Whitacre et al. | |
| 2007/0224514 A1 | 9/2007 | Kotato et al. | |
| 2007/0243463 A1 | 10/2007 | Matsui et al. | |
| 2008/0102377 A1 | 5/2008 | Abe et al. | |
| 2008/0254361 A1* | 10/2008 | Horikawa | H01M 10/052 429/188 |
| 2009/0291368 A1* | 11/2009 | Newman et al. | 429/245 |
| 2010/0040954 A1 | 2/2010 | Amine | |
| 2010/0129721 A1 | 5/2010 | Xu et al. | |
| 2010/0183925 A1 | 7/2010 | Manthiram et al. | |
| 2011/0136019 A1 | 6/2011 | Amiruddin | |
| 2011/0189548 A1 | 8/2011 | Xu | |
| 2011/0281177 A1 | 11/2011 | Xu | |
| 2013/0115529 A1 | 5/2013 | Zhang et al. | |

FOREIGN PATENT DOCUMENTS

| | | |
|---|---|---|
| JP | 2002-124297 A | 4/2002 |
| JP | 2002231309 A * | 8/2002 |
| JP | 2002-352851 A | 12/2002 |
| JP | 2003-059529 A | 2/2003 |
| JP | 2003-272700 A | 9/2003 |
| JP | 2003-272701 A | 9/2003 |
| JP | 2003-297423 A | 10/2003 |
| JP | 2004-071245 A | 3/2004 |
| JP | 2004259682 A * | 9/2004 |
| JP | 2008-004349 A | 1/2008 |
| WO | 2006/030624 | 3/2006 |
| WO | 2006/077763 A1 | 7/2006 |

OTHER PUBLICATIONS

"Material Safety Data Sheet for Tris(1,1,1,3,3,3-hexafluoroisopropyl)phosphate", Halocarbon.*
Machine translation of Japanese Patent Document No. JP 2002-231309A, published Aug. 16, 2002.*
"Physical Constants of Organic Compounds" in CRC Handbook of Chemistry and Physics, 93rd Edition (Internet Version 2013), W.M. Hayes ed. CRC Press/Taylor and Francis, Boca Raton, FL.*
"Properties of Ethanol, pentafluoro-, phosphate", American Chemical Society, 2014.*
Nam, T-H. et al. "Diphenyloctyl phosphate and tris(2,2,2-trifluoroethyl)phosphite as flame-retardant additives for Li-ion electrolytes at elevated temperature", Journal of Power Sources, vol. 180, pp. 561-567, published Feb. 7, 2008.*
Zhang, S.S. et al. "Tris(2,2,2-trifluoroethyl) phosphite as a co-solvent for nonflammable electrolytes in Li-ion batteries", Journal of Power Sources, vol. 113, pp. 166-172, published Oct. 31, 2002.*
"Bis(trifluoroethyl)fluorophosphate", American Chemical Society, 2017.*
"Trifluoroethyl difluorophosphate", American Chemical Society, 2017.*
Mukerjee, S., et al. "In situ synchrotron X-ray studies on copper-nickel 5V Mn oxide spinel cathodes for Li-ion batteries", vol. 49, pp. 3373-3382, published May 13, 2004. (Year: 2004).*
Machine translation of Japanese Patent Publication No. 62080976-A, published Apr. 14, 1987. (Year: 1987).*
J. Liu and A. Manthiram; Kinetics Study of the 5 V Spinel Cathode LiMn1.5Ni0.5O4 Before and After Surface Modifications; Journal of The Electrochemical Society, 156 11 A833-A838 2009.
J. Liu and A. Manthiram; Improved Electrochemical Performance of the 5 V Spinel Cathode LiMn1.5Ni0.42Zn0.08O4 by Surface Modification; Journal of The Electrochemical Society, 156 1 A66-A72 2009.
K. Amine et al., Preparation and electrochemical investigation of LiMn2-xMexO4 (Me: Ni, Fe, and x= 0.5, 1) cathode materials for secondary lithium batteries, Journal of Power Sources, 68 604-608 (1997).
PCT Notification of Transmittal of International Preliminary Report on Patentability, dated Sep. 7, 2012, for PCT/US11/41356 (same invention), and International Preliminary Report on Patentability.
Cresce et al., "Electrolyte Additive in Support of 5 V Li Ion Chemistry," Journal of the Electrochemical Society, 158 (3) A337-A342 (2011).
March, J., Advanced Organic Chemistry—Reactions, Mechanisms, and Structure, Third Edition, Chapter 5, pp. 144, 150-151 (1985)—(Publisher: John Wiley & Sons).
Xu, "Nonaqueous Liquid Electrolytes for Lithium-Based Rechargeable Batteries," Chem. Rev. (2004), 104, pp. 4303-4417 (entire document, and note, in particular, pp. 4400-4405)—due to document size, reference submitted in 3 parts (1 of 3, 2 of 3 and 3 of 3 parts).
U.S. Appl. No. 14/028,559 (Arthur von Wald Cresce and Kang Conrad Xu), "Electrolyte Additives in Support of Five Volt Lithium Chemistry," filed Sep. 17, 2013.
U.S. Appl. No. 14/027,268 (Arthur von Wald Cresce and Kang Conrad Xu), "Oxirane-Based Additives in Support of Five Volt Lithium Ion Chemistry," filed Sep. 16, 2013.
Abe et al., "Functional Electrolytes—Triple-Bonded Compound as an Additive for Negative Electrode," J. Electrochemical Soc., 154 (8), A810-A815, (2007).
Xu et al., "High Anodic Stability of a New Electrolyte Solvent: Unsymmetric Noncyclic Aliphatic Sulfone," J. Electrochem. Soc., Vo. 145, No. 4, L70-L72 (1998).
Xu et al., "Sulfone-Based Electrolytes for Lithium-Ion Batteries," J. Electrochemical Soc., 149(7), A920-A926 (2002).

* cited by examiner

ELECTROLYTES IN SUPPORT OF 5V LI ION CHEMISTRY

RELATED APPLICATIONS

This application claims benefit of Provisional U.S. Application 61/361,625 filed 2010 Jul. 6.

BACKGROUND OF THE INVENTION

Field of the Invention

The present invention relates to electrolytes that have very wide electrochemical stability window, and can therefore support Li ion chemistries that occurs near or above 5.0 V. More particularly, this invention relates to the compounds that can be incorporated into electrolytes as electrolyte co-solvents, electrolyte additives, or electrolyte solutes, the result of such incorporation being that the electrolytes can support the reversible Li ion intercalation/de-intercalation chemistry at potentials above 4.5 V. Still more particularly, this invention relates to the compounds that can be incorporated into the electrolyte as electrolyte co-solvents, electrolyte additives, or electrolyte solutes, which, upon the initial charging of cathode, decompose sacrificially to form a passivation film. This passivation film prevents sustaining decomposition of electrolyte components but does not hinder the reversible Li ion intercalation/de-intercalation chemistry at potentials above 4.5 V.

The invention of such an electrolyte will enable the use of high voltage cathode materials, affording new rechargeable battery chemistries with higher energy density as well as delivering energy of higher quality in the form of direct electricity current at higher voltages, which are unavailable otherwise from the state-of-the-art electrolytes. The state-of-the-art electrolytes, comprising mainly organic carbonate esters, decompose at potentials below 4.5 V on those high voltage cathode surfaces and cause sustaining capacity fading accompanied with increasing cell impedances.

The said high voltage cathodes include, but are not limited to, transition metal-oxides with spinel lattice structures or metal phosphates with olivine lattice structures, or metal fluorides with conversion reaction natures.

More particularly, the novel compounds of the present invention goes beyond the battery application and could benefit any electrochemical devices that pursue higher operating potentials. The presence of the novel compounds in the electrolyte can stabilize the highly oxidizing surface of the positive electrode and hence enable new chemistry that is otherwise impossible with the current state-of-the-art electrolyte technology. Such electrochemical devices include, but are not limited to, rechargeable batteries, double layer capacitors, pseudo-capacitors, electrolytic cells, fuel cells, et cetera.

Still more particularly, the batteries or the electrochemical devices comprise, but are not limited to, (1) an anode such as lithium or other alkaline metals, alloys of lithium or other alkaline metals, intercalation hosts such as layered structured materials of graphitic, carbonaceous, oxides or other chemical natures, non-intercalating hosts of high surface area or high pseudo-capacitance, et ceteras; (2) a cathode such as an intercalation host based on metal oxides, phosphates, fluorides or other chemical natures, or non-intercalating hosts of high surface area or high pseudo-capacitance, et ceteras; and (3) an electrolyte of the present invention. These electrolytes comprise (a) one or more electrolyte solutes with various cations and anions, (b) a solvent or a mixture of solvents based on organic carbonates or other compounds, and (c) one or more additives. Any of (a), (b) and (c) could be from the claimed structures of the present invention.

Description of the Prior Arts

Li ion chemistry is established upon reversible intercalation/de-intercalation of Li ion into/from host compounds. The voltage of such an electrochemical device is determined by the chemical natures of anode and cathode, where Li ion is accommodated or released at low potentials in the former, and at high potentials in the latter. Apparently, the reversibility of the cell chemistry and the resultant energy density are limited by the stability of the electrolyte to withstand the reductive and oxidative potentials of these electrodes. In today's market, a majority of Li ion batteries use organic carbonate as electrolyte solvents, which decompose oxidatively above 4.5 V vs. Li, and set an upper limit to the candidate cathode chemistry. Despite the fact that 5 V Li ion chemistry has already been made available from such cathodes like olivine structured $LiCoPO_4$ (~5.1 V) and spinel structured $LiNi_{0.5}Mn_{1.5}O_4$ (~4.7 V), their advantages such as high energy density and quality cannot be realized due to the lack of an electrolyte that is able to withstand high voltage operation.

Early attempts have been made by one of the inventors to identify an electrolyte system that can resist oxidation beyond 5.0 V, and unsymmetrical sulfones were shown to be such a system on spinel $LiMn_2O_4$ surface (K. Xu, et al, *J. Electrochem. Soc.*, 1998, Vol. 145, L70; *J. Electrochem. Soc.*, 2002, Vol. 149, A920). However, intrinsic shortcomings of sulfone as a major electrolyte component, including its failure to form a protective layer on graphitic anode, slow Li ion kinetics, and poor electrode active material utilization caused by high viscosity, prevented wide application.

Additional improvements were also made on mitigating the oxidizing nature on the cathode surfaces through surface coating approaches, and various metal oxides or phosphates were shown to be effective in elongating the service life of the carbonate-based electrolytes (J. Liu, et al, *Chem. Mater,* 2009, Vol. 21, 1695). But these coating approaches have their own intrinsic shortcomings as well. They not only add additional cost to the manufacturing of the cathode materials, but also induce further interphasial resistance to the Li ion migration at electrolyte/cathode junction. Moreover, overall coverage of cathode particle surface with those inert coatings will inevitably decrease the energy density of the device.

It is therefore of significant interest to the battery industry to find a technology that can effectively enable the 5.0 V class cathode to be applied in Li ion batteries, without the aforementioned shortcomings.

To be more specific, it is therefore of significant interest to the battery industry to find a technology that can effectively enable the 5.0 V class cathode to be applied in Li ion batteries, while there is no major negative impact on the original electrolyte and cathode materials. Such negative impact have been exhibited in the prior arts, and include but are not limited to, the failure of electrolyte to form desired interphasial chemistry on graphitic anode, the slowed Li ion kinetics and difficult electrode wetting due to high electrolyte viscosity, the increased electrolyte/cathode interphasial impedance, additional processing cost of material manufacturing, and sacrificed cathode energy density, et cetera.

It is therefore still of significant interest to the battery industry to identify such electrolytes that can stably support reversible Li ion chemistry, without those shortcomings exhibited by the prior arts.

It is therefore still of significant interest to the battery industry to identify such compounds that, once incorporated as an electrolyte component, can assist in forming a protective layer on the surface of the 5.0 V class cathodes.

It is therefore still of significant interest to the battery industry to identify such compounds that could serve the aforementioned purposes either as electrolyte solvent, co-solvent, solute, or both molecular and ionic additives.

This invention will provide such a technology of the electrolytes with all those desired merits.

SUMMARY OF THE INVENTION

Therefore, it is highly desirable to develop electrochemical cells that can reversibly store and release electricity at voltages above 4.5 V.

More specifically, it is highly desirable to develop electrochemical cells that can reversibly store and release electricity at voltages in the neighborhood of or above 5.0 V.

Still more specifically, it is highly desirable to develop the aforementioned electrochemical cells, which include, but are not limited to, rechargeable batteries that are based on Li ion chemistry, or electrochemical double-layer capacitors that comprise high surface area electrodes.

Still more specifically, it is highly desirable to develop the aforementioned electrochemical cells based on Li ion chemistry, which comprise of 5.0 V class cathode materials such as, but are not limited to, spinel metal oxide $LiNi_{0.5}Mn_{1.5}O_4$ or olivine phosphate $LiCoPO_4$, and materials of other chemical natures.

Still more specifically, it is highly desirable to develop the aforementioned electrochemical cells based on electrochemical double layer capacitance, which comprise high surface area materials as electrodes, such as, but are not limited to, activated carbon, aligned or random carbon nanotubes, various aerogels and materials of other chemical natures.

Further more specifically, it is highly desirable to formulate novel electrolyte compositions that would enable the aforementioned electrochemical cells.

Further more specifically, it is highly desirable to identify and develop novel compounds that, once incorporated into electrolytes either as electrolyte solvent, co-solvent, solute or molecular and ionic additives, would assist in stabilizing the electrolyte against oxidative decompositions, without negatively impacting the properties and performances of the electrochemical cells as in the prior arts.

It is therefore the primary objective of the present invention to identify and develop such novel compounds.

It is another objective of the present invention to develop the electrolyte compositions utilizing the said novel compounds either as solvent, co-solvent, solute, or molecular and ionic additives. Electrolytes so formulated will have an extra wide electrochemical stability window, and are capable of supporting electrochemical processes occurring at high potentials without degrading.

It is still another objective of the present invention to assemble electrochemical cells utilizing the said electrolyte solutions. The said electrochemical cells include, but are not limited to, rechargeable batteries or electrochemical double-layer capacitors that have been described above. The cells thus developed should deliver superior performances as compared with the state-of-the-art technologies in terms of the energy density and energy quality.

These and additional objectives of the invention are accomplished by adopting one or more novel compounds either as solvent, co-solvent, solute, or molecular and ionic additives in the non-aqueous electrolytes.

More particularly, these and additional objectives of the invention are accomplished by adopting one or more novel compounds in the non-aqueous electrolytes, which are soluble in the non-aqueous, organic electrolyte solvents to certain concentrations.

Still more particularly, these novel compounds, upon dissolution in the non-aqueous electrolytes, will form desirable interphasial chemistry on cathode surfaces.

Still more particularly, these novel compounds, upon dissolution in the non-aqueous electrolytes, will either form desirable interphasial chemistry on anode surfaces, or will not negatively impact the other electrolyte components to form desirable interphasial chemistry on anode surfaces.

With the electrolyte solutions comprising these novel compounds either as solvent, co-solvent, solute, or molecular and ionic additives in the non-aqueous electrolytes, all the said objectives can be achieved.

Definitions

Before describing the present invention in detail, it is necessary to define the terminologies used in this invention so that it helps to understand the spirit of this invention. It is to be understood that the definition herein is for the purpose of describing particular embodiments only, and is not intended to be limiting.

In the present disclosure, the said "organic" refers to a structure that contains hydrocarbon moieties.

In the present disclosure, the said "inorganic" refers to a structure that contains no hydrocarbon moieties.

In the present disclosure, the said "halogen" refers to fluorine, chlorine, bromine and iodine.

In the present disclosure, the said "alkyl" refers to a hydrocarbon structure, with or without unsaturations, or their perhalogenated or partially halogenated derivatives.

The said "solvent" refers to molecular components of the electrolyte.

The said "solute" or "salt" refers to ionic components of the electrolyte, which will dissociate into cationic and anionic species upon dissolution in the solvents or mixture of co-solvents.

The said "co-solvents" refers to molecular components of the electrolyte whose concentrations are at least 10% by weight.

Furthermore, the said "additives" are the molecular components of the electrolyte whose concentrations are lower than 10% by weight.

The said "molecular" refers to compounds that cannot be dissociated into any ionic species in non-aqueous electrolyte solvents.

The said "ionic" refers to compounds that can be dissociated into a cation species that bears positive charge and an anion species that bears equal but negative charge in non-aqueous electrolyte solvents.

BRIEF DESCRIPTION OF THE DRAWINGS

A more complete appreciation of the invention will be readily obtained by reference to the following Detailed Description of the Preferred Embodiments and the accompanying drawings. The representations in each of the following figures and examples are intended to demonstrate the spirit of the present invention by way of illustration. They are by no means intended to limit the full extent of the invention; but rather, the present invention may be employed according to the full scope and spirit of the invention as defined in the appended claims.

Table 1 summarizes the skeleton structures of the electrolyte additives of this invention.

Table 2 shows selected examples of these additives that were used to form electrolytes.

Table 3 showed selected electrolyte solution formulations by using the base electrolyte and the novel compounds disclosed in the present invention, as either electrolyte solvent, co-solvent, solute, or additives.

DETAILED DESCRIPTION OF THE PREFERRED EMBODIMENTS

Figure 1:
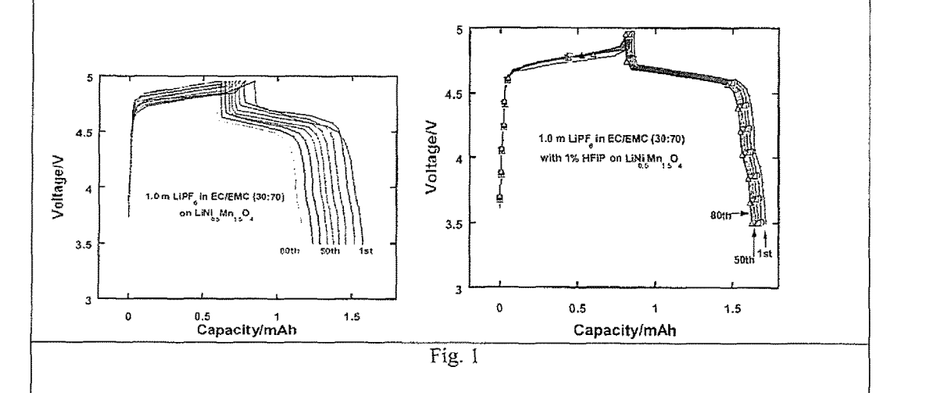
FIG. 1 shows the comparison of voltage profiles between baseline, state-of-the-art electrolyte (left) and 1% additive of tris(1,1,1,3,3,3-hexafluoro-iso-propyl) phosphate (compound 11 in Table 2) in base electrolyte (right) on $LiNi_{0.5}Mn_{1.5}O_4$ surface. For graphic clarity only cycles between the initial and the $100^{th}$ were shown with an increment of 10 cycles.
Figure 2:
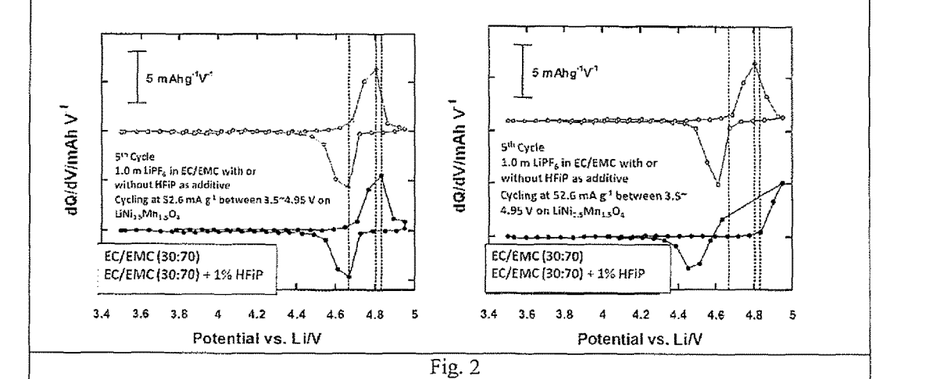
FIG. 2 shows the comparison of differential capacity plotted vs. voltage for base electrolyte and 1% additive of tris(1,1,1,3,3,3-hexafluoro-iso-propyl)phosphate (compound 11 in Table 2) this invention in base electrolyte at the $5^{th}$ (left) and $80^{th}$ (right) cycles.
Figure 3:
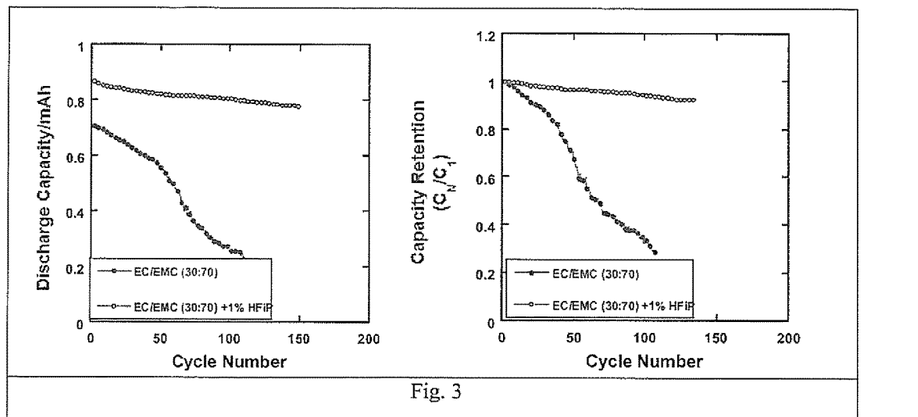
FIG. 3 shows the comparison of capacity utilization (left) and capacity retention (right) of $LiNi_{0.5}Mn_{1.5}O_4$/Li half cells cycled in base electrolyte and 1% additive of tris(1,1,1,3,3,3-hexafluoro-iso-propyl)phosphate (compound 11 in Table 2) in base electrolyte under galvanostatic condition.
Figure 4:
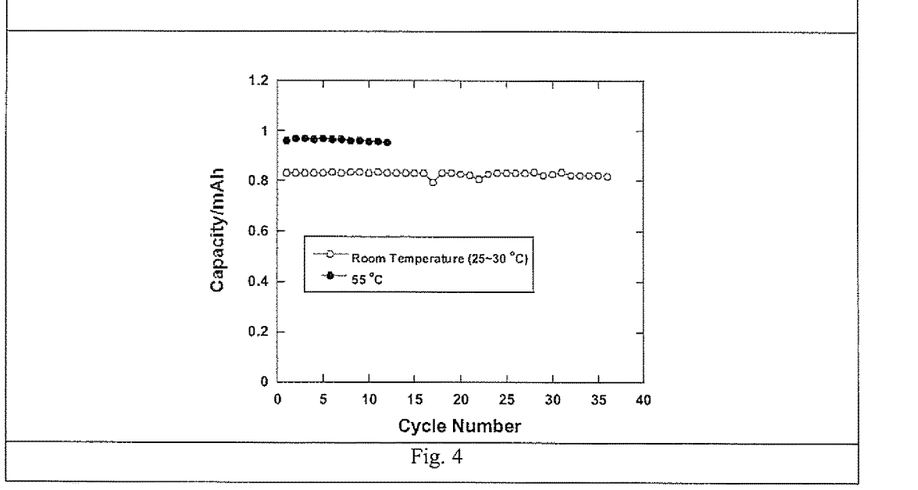
FIG. 4 shows the capacity retention of a modified spinal 5 V cathode materials material ($LiNi_{0.5}Mn_{1.5}O_4$) in half cell configuration cycled in electrolyte with 1% additive of tris(1,1,1,3,3,3-hexafluoro-iso-propyl)phosphate (compound 11 in Table 2) under galvanostatic conditions, at both RT and 55° C.

As a primary aspect of the invention, the novel compounds of the present invention are constructed on the basis of the molecular or ionic compounds whose skeleton structures were shown in structures 1 through 8 in Table 1, where: $R^1$, $R^2$, $R^3$, $R^4$, $R^5$ and $R^6$ designate substituent, which can be identical or different from each other. These are hydrogen, hydroxyl, or halogen. The hydroxyl is hydroxide salts with metal ions of various valences. Examples of which include, but are not limited to, $Li^+$, $Na^+$, $\frac{1}{2}Mg^{2+}$, $\frac{1}{4}Al^{3+}$, et cetera. These are normal or branched alkyls with carbon number from 1 through 30, with or without unsaturation. These are halogenated normal or branched alkyls with carbon number from 1 through 30, with or without unsaturation which can be partially halogenated or perhalogenated, normal or branched alkyls with carbon number from 1 through 30, with or without unsaturation; which can be partially halogenated or perhalogenated normal or branched alkyls with carbon number from 1 through 30, where the halogen substituents can be identical or different selected from F, Cl, Br or I, or mixture of all halogens.

TABLE 1

Structure of Novel Compounds in the Present Invention

(1)

TABLE 1-continued

Structure of Novel Compounds in the Present Invention

(2)

(3)

(4)

(5)

(6)

(7)

(8)

Examples of $R^1$, $R^2$, $R^3$, $R^4$, $R^5$ and $R^6$ include, but are not limited to, trifluoromethyl, trichloromethyl, 1,1,1-trifluoro- ethyl, perfluoroethyl, perfluoro-iso-propyl, 1,1,1,3,3,3,-hexafluoropropyl, perfluoro-tert-butyl, perfluorododecayl, et cetera. As a way to illustrate, Table 2 listed, selected compound that were included in the compound families as described in Table 1.

TABLE 2

Example of Novel Compounds covered in Table 1

(9)

(10)

(11)

(12)

(13)

(14)

TABLE 2-continued

Example of Novel Compounds covered in Table 1

(15)

(16)

(17)

Preferentially, but not intended to be limiting, the novel compounds can be dissolved in typical non-aqueous electrolyte solvent or mixture of solvents.

Preferentially but not intended to be limiting, the novel compounds can serve in the electrolyte either as major solvents, or co-solvents at contents above 10% by weight, or as salts at concentrations as high as 3.0 m, or as additives at concentrations below 10% by weight.

The above-mentioned typical non-aqueous electrolyte solvents comprise, but are not limited to, organic carbonate esters such as ethylene carbonate (EC), propylene carbonate (PC), dimethylcarbonate (DMC), ethylmethylcarbonate (EMC), diethylcarbonate (DEC), 1-(trifluoromethyl)ethylene carbonate ($CF_3$-EC), et cetera; or organic acid esters such as alkyl carboxylates, lactones, et cetera; and inorganic acid esters such as alkyl sulfonates, alkyl sulfurates, alkyl phosphonates, alkyl nitrates, and et cetera; or dialkyl ethers that are either symmetrical or unsymmetrical, or alkyl nitriles.

The above-mentioned typical non-aqueous electrolytes also comprise electrolyte solutes that are based on a cation and an anion. The cation selections include but are not limited to, alkali metal salts such as lithium (Li), sodium (Na), potassium (K), et cetera, or alkali earth metal salts such as beryllium (Be), magnesium (Mg), calcium Ca), et cetera, or tetraalkylammonium or phosphonium ($R_4N$, $R_4P$); whereas the anion selections include but are not limited to ($PF_6$), hexafluoroarsenate ($AsF_6$), tetrafluoroborate ($BF_4$), perfluoroalkylfluorophosphate ($PF_xR_{F(6-x)}$), perfluoroalkyl-fluoroborate ($BF_xR_{F(4-x)}$), bis(trifluoromethanesulfonyl)imide (($CF_3SO_2$)$_2$N), bis(perfluoroethanesulfonyl)imide (($CF_3CF_2SO_2$)$_2$N), bis(oxalato)borate (($C_2O_4$)$_2$B), (difluorooxalato)borate ($C_2O_4FB$). The salts are selected by combining these cation and anions.

The above-mentioned typical electrolyte solutes are selected from the novel compounds of the present invention.

More preferentially but not intended to be limiting, the novel compounds of this invention comprise at least one fluorine in the structure.

With the purpose of illustrating only and no intention to be limiting, novel compounds of this invention can be selected from the following list: tris(1,1,1,3,3,3-hexafluoro-iso-propyl)phosphate (compound II in Table 2), tris(perfluoroethyl)phosphate, tris(perfluoro-iso-propyl)phosphate (compound 12 in Table 2), bis(1,1,1-trifluoroethyl)fluorophosphate (compound 10 in Table 2), tris(1,1,1-trifluoroethyl)phosphite (compound 9 in Table 2); hexakis(1,1,1-trifluoroethoxy)phosphazene (compound 14 in Table 2), and tris(1,1,1-trifluoroethoxy)trifluorophosphazene (compound 15 in Table 2), et cetera.

In yet further aspects of the invention, electrochemical devices that are filled with the novel electrolyte solution formulated in this invention are fabricated. These devices include, but are not limited to, (1) lithium batteries with lithium metal cells as anode, and various transition metal oxides, phosphates and fluorides as cathode; (2) Li ion batteries with carbonaceous such as graphitic, carbon nanotube, graphene as anode, or non-carbonaceous such as titania or other $Li^+$ intercalating hosts as anode, and various transition metal oxides, phosphates and fluorides as cathode; (3) electrochemical double-layer capacitors with both carbonaceous and non-carbonaceous electrodes of high surface area or high pseudo-capacitance; and (4) dual intercalation cells in which both cation and anion intercalate simultaneously into lattices of anode and cathode materials of either carbonaceous or non-carbonaceous natures, respectively.

The above cells are assembled according to the procedures that can be readily performed by one with ordinary skill in the art. These electrochemical devices containing the novel electrolyte solutions as disclosed in the present invention can enable high voltage rechargeable chemistries that would be otherwise impossible with the state-of-the-art electrolyte technologies.

Having described the invention, the following examples are given to illustrate specific applications of the invention including the best mode now known to perform the invention. They are intended to provide those of ordinary skills in the art with a complete disclosure and description of how to make and use the novel solvents and additives of this invention. These specific examples are not intended to limit the scope of the invention described in this application.

EXAMPLES

Example 1

Synthesis of Tris(1,1,1,3,3,3-hexafluoro-iso-propyl)phosphate (Compound II in Table 2)

To a flask containing 500 mL of diethyl ether, 175 g of 1,1,1,3,3,3-hexafluoroisopropanol is added and stirred until a complete solution is made. To the stirring solution of diethyl ether and 1,1,1,3,3,3-hexafluoropropanol, 8.28 g of solid lithium hydride is added through a solid-addition funnel and allowed to react at room temperature. After 1 hour, the reaction mixture is chilled to the range of 0-5° C. by immersion in a water/ice bath. Once chilled, 53.21 g of phosphorus oxychloride is carefully added. The reaction is considered complete once no more insoluble lithium chloride is formed during reflux of the reaction mixture. The final product, tris(1,1,1,3,3,3-hexafluoroisopropyl)phosphate, is recovered by distillation after filtering off the precipitation.

Example 2

Synthesis of tris(perfluoro-iso-propyl)phosphate (compound 12 in Table 2)

The synthesis of precursor tris(iso-propyl)phosphate was conducted in a similar manner as described in Example 1. The intermediate phosphate was then subjected to either elemental fluorination or electrochemical fluorination to achieve the perfluorinated product. The final product, tris (perfluoro-iso-propyl)phosphate, is recovered by after purification.

Example 3

Synthesis of Tris(1,1,1-trifluoroethyl)phosphate

The synthesis of 1,1,1-trifluoroethoxide lithium was similar to the procedure as described in Example 1. 53.21 g of phosphorus oxychloride is then carefully added. The reaction is considered complete after refluxing. The final product, tris(1,1,1-trifluoroethyl)phosphate, is recovered by distillation after filtering off the precipitation.

Example 4

Synthesis of hexakis(1,1,1-trifluoroethoxy)phosphazene (compound 14 in Table 2)

To a flask containing 500 mL of diethyl ether, 69.1 g of 1,1,1-trifluoroethanol is added and stirred until a complete solution is made. Then 5.48 g lithium hydride was gradually added through a solid addition funnel. After 1 hour, the reaction mixture is chilled to the range of 0-5° C. by immersion in a water/ice bath. Once chilled, 40 g of phosphonitrillic chloride trimer was carefully added with vehement stirring. The purification process was similar to what described in Example 1. After repeated distillation, the final product is a colorless liquid with boiling point of 100° C. at 0.1 torr.

Example 5

Formulation of Novel Electrolyte Solutions

This example summarizes a general procedure for the preparation of novel electrolyte solutions comprising the solvents, solutes and additives of this invention, whose structures have been listed in Table 1. Both the concentration of the lithium salts, the co-solvent ratios, and the relative ratios between the additives to solvents can be varied according to needs.

The salts selected include, but are not limited to, $LiPF_6$, $LiAsF_6$, $LiBF_4$, $LiP(C_nF_{2n+1})_xF_{6-x}$ (0≤n≤10, 0≤x≤6), $LiB(C_nF_{2n+1})_xF_{4-x}$ (0≤n≤10, 0≤x≤4), LiIm, LiBeti, LiBOB, and $LiBF_2C_2O_4$, triethylmethylammonium ($Et_3MeNPF_6$), any one or more of the novel compounds whose structures were listed in Table 1, and mixtures thereof.

The solvents selected include, but are not limited to, EC, PC, DMC, DEC, EMC, FEC, $CF_3$-EC, any one or more of the novel compounds whose structures were listed in Table 1, and mixtures thereof.

The additives selected include any one or more of the novel compounds whose structures were listed in Table 1 or Table 2, and mixtures thereof.

The resultant electrolyte solution should contain at least one of those novel compounds that are disclosed in the present invention.

In one instance, 1000 g base electrolyte solution of 1.0 m LiPF$_6$/EC/EMC (30:70) was made in glovebox by mixing 300 g EC and 700 g EMC followed by adding 151.9 g LiPF$_6$. The aliquots of the base electrolyte solution was then taken to be mixed with various amount of Tris(1,1,1,3,3,3-hexafluoro-iso-propyl)phosphate as synthesized in Example 1. The concentration of Tris(1,1,1,3,3,3-hexafluoroisopropyl)phosphate ranges from 0.1 ppm up to 5%.

In a similar instance, 1000 g base electrolyte solution of 1.0 m LiPF$_6$/FEC/EC/EMC (15:15:70) was made in glovebox by mixing 150 g FEC, 150 g EC and 700 g EMC followed by adding 151.9 g LiPF$_6$, and aliquots of the base electrolyte solution was then taken to be mixed with various amount of Tris(1,1,1,3,3,3-hexafluoroisopropyl)phosphate as synthesized in Example 1. The concentration of Tris(1,1,1,3,3,3-hexafluoroisopropyl)phosphate ranges from 0.1 ppm up to 5%.

In another similar instance, 1000 g base electrolyte solution of 1.0 m LiPF$_6$/Tris(1,1,1,3,3,3-hexafluoroisopropyl)phosphate/EC/EMC (15:15:70) was made in glovebox by mixing 150 g Tris(1,1,1,3,3,3-hexafluoroisopropyl)phosphate as synthesized in Example 1, 150 g EC and 700 g EMC followed by adding 151.9 g LiPF$_6$.

In other similar instances, the novel electrolyte solutions with other novel compounds at varying concentrations were also made with tris(perfluoro-iso-propyl)phosphate (compound 12 in Table 2), or hexakis(1,1,1-trifluoroethoxy)phosphazene (compound 14 in Table 2), or Tris(1,1,1-trifluoroethyl)phosphate, et ceteras.

With purpose of illustrating only and no intention to be limiting, Table 3 listed some typical electrolyte solutions prepared and tested. It should be noted that the compositions disclosed in Table 3 may or may not be the optimum compositions for the electrochemical devices in which they are intended to be used, and they are not intended to limit the scope of the present invention.

TABLE 3

Novel Electrolyte Solutions with Ionic Additives

| Salt Concentration (m) | Solvent Ratio (by Weight) | Additive Concentration (by Weight) |
|---|---|---|
| LiPF$_6$ (1.0) | EC/FEC/EMC (15:15:70) | 1% Compound 9 |
| LiPF$_6$ (1.0) | EC/Tris(1,1,1-trifluoroethyl)phosphate/EMC (20:10:70) | 1% Compound 11 |
| LiPF$_6$ (1.0) | EC/EMC (30:70) | 1% Compound 14 |
| LiPF$_6$ (1.0) | EC/EMC (30:70) | 1% Compound 9 |
| LiBF$_4$ (1.0) | EC/EMC (30:70) | 1% Compound 11 |
| LiBOB (1.0) | EC/γBL/EMC/MB (15:15:30:30) | 1% Compound 9 |
| Et$_3$MeNPF$_6$ (2.0) | EC/EMC (30:70) | 1% Compound 16 |
| LiPF$_6$ (1.0) | EC/(1,1,1,3,3,3-hexafluoroisopropyl)methyl carbonate/EMC (20:10:70) | None |

Example 6

Fabrication of an Electrochemical Cell

This example summarizes the general procedure of the assembly of electrochemical cell. These electrochemical cells include Li ion cell, double layer capacitor, or dual intercalation cell. Typically, a piece of Celgard polypropylene separator was sandwiched between an anode and a cathode. The cell was then activated by soaking the separator with the electrolyte solutions as prepared in Example 5, and sealed with appropriate means. All above procedures were conducted under dry atmospheres in either glovebox or dryroom.

With the invention having been described in general and in details and the reference to specific embodiments thereof, it will be apparent to one ordinarily skilled in the art that various changes, alterations, and modifications can be made without departing from the spirit and scope of the invention and its equivalents as defined by the appended claims.

What is claimed:

1. A non-aqueous electrolyte solution for a high energy electrochemical cell containing at least one compound to passivate the surface of a cathode in said electrochemical cell, said compound is selected from the group consisting of:

where:
R¹, R², R³, R⁴, R⁵ and R⁶ designate substituents, which are identical or different from each other;
which are hydrogen, hydroxyl, or halogen containing at least one F atom;
which are hydroxide salts with metal ions of various valences, comprising $Li^+$, $Na^+$, $\frac{1}{2}Mg^{2+}$ or $\frac{1}{3}Al^{3+}$;
which are normal or branched alkyls with a carbon number from 1 through 30, with or without unsaturation;
which are halogenated normal or branched alkyls with a carbon number from 1 through 30, with or without unsaturation;
which are partially halogenated or perhalogenated normal or branched alkyls with a carbon number from 1 through 30, with or without unsaturation; or
which are partially halogenated or perhalogenated normal or branched alkyls with a carbon number from 1 through 30, where the halogen substituents are identical or different and selected from the group of F, Cl, Br or I, or mixtures thereof;
wherein the concentration of the selected compound or mixtures thereof in the non-aqueous electrolyte solution ranges from 0.1 ppm to below 5% by weight with respect to a total weight of the non-aqueous electrolyte solution, and
wherein, upon charging of the electrochemical cell, the selected compound or mixtures thereof in the non-aqueous electrolyte solution decompose sacrificially to form a passivation film on a surface of the cathode of the electrochemical cell so that the passivation film formed prevents decomposition of electrolyte components at potentials above 4.5 V.

2. The non-aqueous electrolyte solution of claim 1, wherein the concentration of the selected compound or mixtures thereof ranges from 0.1 ppm to 1% by weight with respect to the total weight of the non-aqueous electrolyte solution.

3. The non-aqueous electrolyte solution of claim 1 containing a solvent selected from the group consisting of cyclic or acyclic carbonates, carboxylic esters, cyclic or acyclic ethers, cyclic or acyclic organic sulfones and sulfites, cyclic or acyclic nitriles and mixtures thereof.

4. The non-aqueous electrolyte solution of claim 1, containing a salt selected from the group consisting of lithium hexafluorophosphate ($LiPF_6$), lithium hexafluoroarsenate ($LiAsF_6$), lithium tetrafluoroborate ($LiBF_4$), lithium perfluoroalkylfluorophosphate ($LiP(C_nF_{2n+1})_xF_{6-x}$, where $0 \leq n \leq 10$, $0 \leq x \leq 6$), lithium perfluoroalkylfluoroborate ($LiB(C_nF_{2n+1})_xF_{4-x}$, where $0 \leq n \leq 10$, $0 \leq x \leq 4$), lithium bis(trifluoromethanesulfonyl)imide (LiIm), lithium bis(perfluoroethanesulfonyl)imide (LiBeti), lithium bis(oxalato)borate (LiBOB), lithium (difluorooxalato)borate ($LiBF_2C_2O_4$) and mixtures thereof.

5. The non-aqueous electrolyte solution of claim 1, containing an ionic compound species to effectively passivate the cathode surface so that bulk electrolyte species or anions of the ionic compound species remain stable on the cathode surface up to potentials 5.0 V above that of Li, said species being either cation or anion or both and derived from any of the selected compounds.

6. A high energy electrochemical cell comprising:
a negative electrode;
a positive electrode;
a porous polyolefin separator; and
the non-aqueous electrolyte solution according to claim 1;
wherein the negative electrode is selected from the group consisting of carbonaceous materials with various degrees of graphitization, lithium or other alkaline metals, alloys of lithium or other alkaline metals, graphite as intercalation host, oxides and non-intercalation hosts of high surface area and high pseudocapacitance; and
wherein the concentration of the selected compound or mixtures thereof in the non-aqueous electrolyte solution ranges from 0.1 ppm to below 5% by weight with respect to the total weight of the non-aqueous electrolyte solution.

7. The electrochemical cell of claim 6, having a positive electrode comprising an active material selected from the group consisting of transition metal oxides, metal phosphates, chalcogenides, and carbonaceous materials with various degrees of graphitization.

8. The electrochemical cell of claim 6 comprising positive and negative electrodes of material having either high surface area for double-layer capacitance, or high pseudocapacitance, or a mixture of both.

9. The electrochemical cell of claim 6, wherein the electrodes are activated carbon, aligned or random carbon nanotubes, aerogels or other material having a high surface area.

10. The electrochemical cell of claim 6, comprising a rechargeable lithium battery, a dual intercalation cell wherein both cation and anion intercalate simultaneously, a double-layer capacitor having high surface area electrodes or a pseudo capacitor.

11. A method for producing a high energy electrochemical cell comprising the steps of:
adding to an electrolyte solution at least one compound to passivate the surface of a cathode in said electrochemical cell, said compound is selected from the group consisting of -continued where:
R¹, R², R³, R⁴, R⁵ and R⁶ designate substituents, which are identical or different from each other;
which are hydrogen, hydroxyl, or halogen containing at least one F atom;
which are hydroxide salts with metal ions of various valences, comprising $Li^+$, $Na^+$, $½Mg^{2+}$ or $⅓Al^{3+}$;
which are normal or branched alkyls with a carbon number from 1 through 30, with or without unsaturation;
which are halogenated normal or branched alkyls with a carbon number from 1 through 30, with or without unsaturation;
which are partially halogenated or perhalogenated normal or branched alkyls with a carbon number from 1 through 30, with or without unsaturation; or
which are partially halogenated or perhalogenated normal or branched alkyls with a carbon number from 1 through 30, where the halogen substituents are identical or different and selected from the group of F, Cl, Br or I, or mixtures thereof; and
charging the cathode in the electrochemical cell;
wherein the selected compound or mixtures thereof is added to the electrolyte solution in an amount such that a concentration of the selected compound or mixtures thereof in the electrolyte solution ranges from 0.1 ppm to below 5% by weight with respect to a total weight of the electrolyte solution, and
wherein, upon the charging of the electrochemical cell, the selected compound or mixtures thereof in the electrolyte solution decompose sacrificially to form a passivation film on a surface of the cathode of the electrochemical cell so that the passivation film formed prevents decomposition of electrolyte components at potentials above 4.5 V.

12. The method of claim 11, wherein the electrochemical cell is a rechargeable lithium battery.

13. The method of claim 11, wherein the cathode is formed of spinel metal oxide or olivine phosphate.

14. The method of claim 11, wherein the selected compound or mixtures thereof is added to the electrolyte solution in an amount such that the concentration of the selected compound or mixtures thereof in the electrolyte solution ranges from 0.1 ppm to 1% by weight with respect to the total weight of the electrolyte solution.

15. A method for producing a high energy electrochemical cell comprising the steps of:
adding to an electrolyte solution at least one compound to passivate the surface of a cathode in said electrochemical cell, said at least one compound comprising:

and
charging the cathode in the electrochemical cell;
wherein the at least one compound or mixtures thereof is added to the electrolyte solution in an amount such that a concentration of the at least one compound or mixtures thereof in the electrolyte solution ranges from 0.1 ppm to below 1% by weight with respect to a total weight of the electrolyte solution, and
wherein, upon the charging of the electrochemical cell, the at least one compound or mixtures thereof in the electrolyte solution decompose sacrificially to form a passivation film on a surface of the cathode of the electrochemical cell so that the passivation film formed prevents decomposition of electrolyte components at potentials above 4.5 V.

16. A non-aqueous electrolyte solution for a high energy electrochemical cell containing at least one compound to passivate the surface of an electrode in said electrochemical cell, said compound comprising:

wherein the concentration of the at least one compound or mixtures thereof in the non-aqueous electrolyte solution ranges from 0.1 ppm to below 1% by weight with respect to a total weight of the non-aqueous electrolyte solution.

17. A high energy electrochemical cell comprising:
a negative electrode;
a positive electrode;
a porous polyolefin separator; and the non-aqueous electrolyte solution according to claim 16;
wherein the negative electrode is selected from the group consisting of carbonaceous materials with various degrees of graphitization, lithium or other alkaline metals, alloys of lithium or other alkaline metals, graphite as intercalation host, oxides and non-intercalation hosts of high surface area and high pseudo-capacitance; and
wherein the concentration of the at least one compound or mixtures thereof in the electrolyte solution ranges from 0.1 ppm to below 1% by weight with respect to the total weight of the non-aqueous electrolyte solution.

* * * * *